United States Patent Office 3,121,714
Patented Feb. 18, 1964

---

3,121,714
ANTIBIOTIC RECOVERY PROCESS
Merton G. Gollaher, Niantic, and Peter A. Guercio, Groton, Conn., assignors to Chas. Pfizer & Co., Inc., New York, N.Y., a corporation of Delaware
No Drawing. Filed July 31, 1961, Ser. No. 127,857
10 Claims. (Cl. 260—210)

This invention relates to a novel recovery process which is particuarly applicable to nitrogen-basic antibiotics. The invention more specifically concerns the extraction of antibiotics such as streptomycin, neomycin, bacitracin, viomycin and polymyxin from impure aqueous solutions thereof, wherein the impurities present are those normally obtained during conventional antibiotic fermentations.

A number of methods for the purification and recovery of polypeptide or nitrogen-basic antibiotics are known. For example, resin techniques are frequently used, while sequestering agents are often added to the broths to form complexes with polyvalent metal ions like calcium and thus remove them from the antibiotic broth. Various solvent extractions are also known. For instance, streptomycin can be extracted into a solvent such as n-butanol in the presence of various wetting agents. Unfortunately, all of these methods have been found to possess a certain number of drawbacks or disadvantages. For instance, with the usual ion-exchange methods, it is very difficult to process whole fermentation broth. In the butanol extraction process, on the other hand, because of the high mutual solubility of n-butanol and water, serious emulsion problems are often encountered and solvent losses may be very high.

It is among the objects of this invention to overcome these and other disadvantages of the prior art recovery techniques. A particular object of this invention is to provide an economically advantageous process, much more practical than the solvent extraction method and much more feasible with whole broth than the ion-exchange method. These and other objects are now realized by the recovery process of the present invention, wherein the desirable selectivity of the ion-exchange process is equaled or bettered, reactant losses are minimized, time and equipment tie-up are lessened, and many other advantages are experienced.

According to this invention, there is added to an impure aqueous solution containing the desired nitrogen-basic antibiotic, a certain type of alkyl acid phosphate in a certain proportion, together with a certain minimum volume of a water-immiscible organic solvent and most desirably one selected from the group consisting of water-immiscible lower alkyl ketones, alkane hydrocarbons having from six to sixteen carbon atoms, halogenated lower hydrocarbons, aromatic hydrocarbons like benzene, toluene, xylene, and so forth, higher alkanols having from six to ten carbon atoms, benzyl alcohol and water-immiscible lower alkyl esters of alkane hydrocarbon carboxylic acids having up to twelve carbon atoms in their molecular structure. Preferred water-immiscible lower alkyl ketones includes methyl isopropyl ketone, methyl isobutyl ketone, di-n-propyl ketone, methyl n-amyl ketone, and the like; preferred alkane hydrocarbons having from six to sixteen carbon atoms include n-hexane, n-octane, n-decane and kerosene; preferred halogenated lower hydrocarbons include methylene chloride, chloroform, carbon tetrachloride, ethylene dichloride, trichloroethylene and s-tetrachloroethane; preferred higher alkanols include n-hexanol, n-heptanol, 2-ethylhexanol, n-octanol and n-decanol; while preferred water-immiscible lower alkyl esters of alkane hydrocarbon carboxylic acids having up to twelve carbon atoms in their molecular structure include isoamyl formate, n-butyl acetate, n-propyl propionate, ethyl n-caproate, methyl laurate, etc. During this extraction step, the pH is maintained within a critical range as is hereinafter discussed in more detail in the description to follow. After the solvent and the aqueous phases have separated, the solvent phase is recovered while the impurities generally remain in the aqueous phase. The antibiotic is then extracted from the solvent phase into an aqueous acid medium at a low pH.

The alkyl acid phosphate must be of the type which may be designated by the formula $RR'HPO_4$, wherein R is an alkyl group containing from four to eighteen carbon atoms, and R' may be the same alkyl radical or another alkyl radical containing from one to eighteen carbon atoms, or it may be phenyl or p-tolyl or it may simply be hydrogen (thus creating a di-acid phosphate). Particularly useful examples of this class of alkyl acid phosphates, which have been found to be especially valuable and preferred in the process of this invention, are those wherein the alkyl groups contain eight carbon atoms and are either straight or branched chain, such as, for example, n-octyl phenyl acid phosphate, isooctyl dihydrogen phosphate, bis(2-ethylhexyl) hydrogen phosphate, etc. Stearyl dihydrogen phosphate is also very useful, although not preferred, as are also bis(n-hexyl) hydrogen phosphate, bis(n-decyl) hydrogen phosphate and bis(n-tridecyl) hydrogen phosphate.

It is surprising but true that the particular organic solvents hereinabove specified are all found to be operable in combination with this particular class of alkyl acid phosphates to achieve the surprising efficiency in antibiotic recovery that characterizes this invention. Why it is that all these different type solvents are so highly effective to substantially the same degree is not thoroughly understood. Nevertheless, the use of these solvents, e.g., methyl isobutyl ketone, n-hexane, toluene, methylene chloride and kerosene, in the proportion of at least about one-sixth by volume of the broth, in conjunction with the alkyl acid phosphate in the proportion of at least about one mole per mole of the antibiotic, while maintaining a pH of between about 5.0 and about 9.0, results in most efficacious extraction of the nitrogen-basic antibiotic from the aqueous broth with its impurities into the solvent phase. When this phase is then treated with aqueous acid at a substantially lower pH, say, between about 1.0 and about 3.0, the antibiotic passes into the aqueous phase, leaving the impurities behind in the solvent layer. Upon concentration and recovery of the antibiotic from this aqueous acid, using any of the methods already well known, the product is generally of such high purity and potency as to be marketable per se.

As hereinbefore indicated, the stipulated proportions of the several reagents and the specified pH ranges at the various steps of the process, in combination, are critical to achieve the highest yields of the purest antibiotic. For instance, generally from about one to about five moles of the alkyl acid phosphate should be used per mole of antibiotic (although an excess above the upper limit of the aforesaid range is not harmful), while between about one and about two moles of said phosphate per mole of the antibiotic are preferred. The proportion of organic solvent is best measured by volume, of course, and at least about one-sixth by volume of it is employed per unit volume of the impure antibiotic solution to be extracted. There is generally no advantage to be gained by utilizing more than equal volumes of solvent and antibiotic broth, and the preferred proportion of solvent is from about one-sixth to about one-third the volume of the antibiotic solution. During the extraction, a pH of from about 5.0 to about 9.0 should be employed, while the preferred range is between about 5.5 and about 8.0. Subsequently during the extraction from the organic phase into the aqueous phase, a pH of about 3.0 or below is desirable. The alkyl acid phosphate and extraction solvent may be premixed and then admixed with the antibiotic solution to be purified; or they may be added separately to the solution, simultaneously or in either order. Standard mixing techniques and equipment, such as are already well-known, will suggest themselves to those skilled in this art and are readily adapted to this invention.

The process is especially preferred in the recovery of streptomycin, viomycin and polymyxin, but it may also be applied just as easily to other nitrogen-basic antibiotics e.g., neomycin and bacitracin, as has been previously indicated. The method may also be combined with prior art resin and solvent extraction methods to obtain still greater product purity, for instance, as hereinafter illustrated in Example IV.

The following examples are provided to illustrate this invention, but not in any way to limit its scope. It is to be understood that the invention is limited only by the specific wording of the appended claims.

*Example I*

Three liters of streptomycin filtered broth, containing 5.079 grams of streptomycin base as the sulfate (i.e., 6.35 g. of streptomycin sulfate) and assaying 1,693 u./ml., were mixed with one liter of methyl isobutyl ketone containing 29.9 grams of bis(2-ethylhexyl) hydrogen phosphate and the pH adjusted to various values. The methyl isobutyl ketone (MIK) layer was sampled and assayed at each pH level. (The pH of the MIK layer was measured by mixing with an equal volume of water and reading the pH of the stirred two-phase mixture.) The results were as follows:

| Broth pH | MIK Layer Assay (u./ml.) | MIK Layer pH |
|---|---|---|
| 4.9 | 2,799 | 5.4 |
| 5.9 | 4,720 | 6.6 |
| 6.6 | 5,340 | |
| 7.7 | 4,850 | 7.9 |
| 8.1 | 4,860 | 8.3 |

The layers were then separated and 910 cc. of the methyl isobutyl ketone extract were mixed with 330 cc. of water. These two phases were separated and the water, containing impurities and 0.138 gram of streptomycin as free base, was discarded.

The methyl isobutyl ketone phase was then filtered with 10 grams of Super-Cel (a diatomaceous-earth filter aid) and the filtrate extracted with 250 cc. of water at pH 1.4 adjusted with sulfuric acid. The aqueous acid extract was assayed at 17,900 u./ml. and contained 4.75 grams of streptomycin base as the sulfate (i.e., 5.95 g. of streptomycin sulfate). It was adjusted to pH 5.0 with barium hydroxide, filtered and concentrated to about 20 cc. Insolubles were removed by means of filtration and washed with water to a filtrate volume of about 30 cc.

The streptomycin was recovered by means of precipitation from 300 cc. of added methanol. The solids thus obtained were dried under vacuum at 50° C. overnight. Their dry weight was 8.2 grams and they assayed as follows:

Bioassay _____u./mg.___ 548
Chemical assay:
    Maltol _____u./mg.___ 550
    Streptidine _____u./mg.___ 580
Sulfated ash _____percent__ 20.0
Volatiles _____do____ 6.59

*Example II*

Three liters of streptomycin filtered broth, containing 9.4 grams of streptomycin base as the sulfate (i.e., 11.75 g. of streptomycin sulfate), were mixed with one liter of methyl isobutyl ketone and 30 grams of bis(2-ethylhexyl) hydrogen phosphate. The pH was adjusted to 7.1 with sodium hydroxide.

The layers were separated, the aqueous layer discarded and the methyl isobutyl ketone layer washed with 300 cc. of water containing 14.7 cc. of 34% by weight of ethylenediaminetetra-acetic acid tetrasodium salt. The solvent was washed again (two more times) with 300 cc. of water and all the wash liquids were subsequently discarded.

The solvent stream was extracted with 50 cc. of water at pH 2.0 adjusted with sulfuric acid, and re-extracted with 25 cc. of water at pH 1.9. The aqueous extracts were then adjusted to pH 5.6 with barium hydroxide, treated with one-half gram of decolorizing carbon, filtered and washed to a volume of 150 cc.

The treated aqueous stream was then concentrated to 30 cc. by means of evaporation under reduced pressure (using a rotary vacuum evaporator and a temperature below 40° C.), and the solids recovered from it by means of precipitation from 300 cc. of added methanol. The solids thus obtained were filtered and subsequently dried at room temperature in a vacuum oven. They weighed 8.8 grams and assayed as follows:

Bioassay _____u./mg.___ 697
Maltol assay _____u./mg.___ 720
Streptidine assay _____u./mg.___ 700
Volatiles _____percent__ 6.63
Sulfated ash _____do____ 2.42

*Example III*

One hundred cc. of streptomycin broth filtrate, assaying 3,060 u./ml. (0.378 g. of streptomycin base as the sulfate), 33 cc. of methyl isobutyl ketone and 1.2 grams of isooctyl hydrogen phosphate were mixed at pH 7.6. The layers were separated and the solvent layer extracted into 35 cc. of water at pH 2.5. This aqueous acid extract contained 0.250 gram of streptomycin base as the sulfate.

*Example IV*

Four liters of streptomycin broth filtrate, assaying 2,820 u./ml. (14.1 g. of streptomycin base as the sulfate), were treated with sodium fluoride, filtered and washed to a volume of 4.25 liters. The treated broth was then mixed with 5.3 grams of sodium tripolyphosphate, 750 cc. of methyl isobutyl ketone and 24.8 grams of octyl phenyl acid phosphate at pH 7.5. The solvent layer was separated and the aqueous layer discarded.

The recovered solvent volume was 660 cc. Seventy-five ml. were removed for analysis and 585 cc. were washed with 585 cc. of water containing 1 gram of sodium tripolyphosphate. The mixed streams were adjusted to pH 4.95 and separated. The aqueous layer was discarded and the wash treatment repeated twice again with 560 cc. of water.

The solvent layer was then extracted into 50 cc. of water at pH 2.5 with sulfuric acid. A second extraction with 10 cc. of water was made and the extracts were combined. One gram of decolorizing carbon and 5 cc. of an aqueous slurry of Dowex 50×16 hydrogen form resin (a synthetic cation-exchange resin of the sulfonated cross-linked styrene-copolymer type available from the Dow Chemical Co. and consisting of styrene copolymerized with about 16% by weight of divinyl benzene in the presence of a sulfonic acid) were then added, and the mixture stirred, filtered and washed to a total volume of 200 cc. The pH of the resulting filtrate was then adjusted to about 5.0 with barium hydroxide, and the slurry filtered and washed with water to a total filtrate volume of 300 cc.

The filtrate thus obtained was concentrated to 30 cc. and the streptomycin recovered therefrom by precipitating it from 200 cc. of added methanol. The precipitated solids were then filtered and dried under vacuum. They weighed 3.9 grams and assayed as follows:

| | |
|---|---|
| Bioassay | u./mg 700 |
| Maltol assay | u./mg 718 |
| Streptidine assay | u./mg 759 |
| Sulfated ash | percent 0.6 |
| Volatiles | do 4.9 |

*Example V*

Following the procedure of Example III, but utilizing whole broth assaying 2,100 u./ml. (0.210 g. of streptomycin base as the sulfate) rather than filtered broth, three experiments were run employing different concentrations of other acid phosphates. The results obtained in terms of extraction into the methyl isobutyl ketone solvent are tabulated below as follows:

| Agent Concentration in the Solvent | Eq./Eq. of Strep. | Solvent to Aq. Ratio | pH | $K_D^1$ |
|---|---|---|---|---|
| 6.6% Octyl phenyl Acid Phosphate Soln. | 11.7 | ½ | 7.8 | 4.7 |
| 7.8% Stearyl dihydrogen Phosphate Soln. | 11.5 | ½ | 7.8 | 8.0 |
| 4.2% Bis(2-ethylhexyl) Hydrogen Phosphate Soln. | 6.5 | ½ | 7.8 | 13.4 |

[1] The distribution coefficients were obtained by maltol assay of the aqueous extracts of the solvent streams.

*Example VI*

Employing pure aqueous streptomycin solution at a concentration of 30,000 units per ml. instead of broth and again employing methyl isobutyl ketone as an extraction solvent, the effects on the distribution in the solvent of different proportions of an alkyl acid phosphate were studied. The phosphate chosen was bis(2-ethylhexyl) hydrogen phosphate and the results obtained are tabulated below as follows:

| Eq./Eq. of Strep. | pH | Solvent to Aq. | $K_D^1$ |
|---|---|---|---|
| 1.0 | 7.3 | 1 | 105 |
| 0.67 | 7.4 | 1 | 2.5 |
| 0.33 | 7.2 | 1 | 0.6 |

[1] The distribution coefficients were obtained by maltol assay of the aqueous streams and the water extracts of the solvent steams.

*Example VII*

The procedure described in Example VI was followed except that pure aqueous solutions of other nitrogen-basic antibiotics were employed instead of that of streptomcyin. The results obtained with neomycin, bacitracin, viomycin and polymyxin at various carrier levels (equivalents of extracting agent per equivalent of antibiotic) under these otherwise same conditions are tabularized below in the following table:

| Antibiotic Solution | Eq./Eq. of Antibiotic | pH | $K_D^1$ |
|---|---|---|---|
| Neomycin | 1.15 | 7.8 | 136 |
| Bacitracin | 2.4 | 6.0 | 230 |
| Viomycin | 3.4 | 7.7 | 99 |
| Polymixin | 3.1 | 6.5 | 25.6 |

[1] The distribution coefficients were obtained by assaying the aqueous streams and the water extracts of the solvent streams.

*Example VIII*

The precedure of Example II is employed, but utilizing three liters of viomycin filtered broth, assaying 5.67 mg./ml., instead of that of streptomycin. The results obtained in this manner are substantially the same order of magnitude as those reported in the aforementioned example with respect to yield, assay values, and percent volatiles and ash.

*Example IX*

Following the procedure of Example II, but utilizing a polymyxin filtered fermentation broth at the concentration level of 5.67 mg./ml., the results obtained are again of the same order and type as in Example II.

*Example X*

Employing a conventional laboratory one-stage extraction procedure (using a separatory funnel) with filtered streptomycin broth assaying 2,500 u./mg. (maltol method) and 2,200 u./mg. (bioassay method) the extraction process of this invention was carried out using hexane as the extracting solvent with bis(2-ethylhexyl)hydrogen phosphate as the alkyl acid phosphate of choice. The solvent to broth volume ratio was 1:3 and the proportion of the phosphate was 1.5 times that of the streptomycin on an equivalent basis.

The same process was repeated three more times, substituting for the hexane respectively toluene, methylene chloride and kerosene. The results obtained with these four solvents are tabulated below as follows:

| Solvent | $K_D^1$ | Yield (1st Stage) percent |
|---|---|---|
| n-Hexane | 15.3 | 83.6 |
| Toluene | 19.4 | 90.8 |
| Methylene Chloride | 13.2 | 86.8 |
| Kerosene | 3.6 | 64.3 |

[1] The distribution coefficients were obtained by maltol assays of aqueous extracts of the solvent streams.

*Example XI*

The procedure described in Example II is repeated using other alkyl acid phosphates in place of bis(2-ethylhexyl) hydrogen phosphate. The reagents specifically chosen are n-butyl dihydrogen phosphate, methyl n-hexyl hydrogen phosphate, bis(n-hexyl) hydrogen phosphate, n-hexyl p-tolyl acid phosphate, bis(n-decyl) hydrogen phosphate, bis(n-tridecyl) hydrogen phosphate and bis(stearyl) hydrogen phosphate. In each and every case, the results obtained are substantially the same as those reported previously in the aforementioned example.

What is claimed is:

1. In a process for the recovery of nitrogen-basic antibiotics from impure aqueous solutions containing the same, the improvements which comprise adding to such a solution an alkyl acid phosphate having the formula $RR'HPO_4$ wherein R is an alkyl radical containing from four to eighteen carbon atoms and R' is selected from the group consisting of hydrogen, phenyl, p-tolyl and alkyl containing from one to eighteen carbon atoms, in the proportion of at least about one mole for each mole of antibiotic present, together with at least about one-sixth by volume of the broth of a water-immiscible organic solvent, which maintaining the pH substantially within the range of from about 5.0 to about 9.0, permitting the two phases thereby formed to separate, recovering the organic solvent phase, and extracting the antibiotic content therefrom into aqueous acid at a pH between about 1.0 and about 3.0.

2. A process according to claim 1 wherein the alkyl acid phosphate is bis(2-ethylhexyl) hydrogen phosphate.

3. A process according to claim 1 wherein the alkyl acid phosphate is isooctyl dihydrogen phosphate.

4. A process according to claim 1 wherein the alkyl acid phosphate is n-octyl phenyl acid phosphate.

5. A process according to claim 1 wherein the nitrogen-basic antibiotic is streptomycin.

6. A process according to claim 1 wherein the nitrogen-basic antibiotic is viomycin.

7. A process according to claim 1 wherein the nitrogen-basic antibiotic is polymyxin.

8. A process according to claim 1 wherein the organic solvent is methyl isobutyl ketone.

9. A process according to claim 1 wherein the organic solvent is toluene.

10. A process for the recovery of streptomycin sulfate from a microorganism fermentation broth containing the same, which comprises mixing with the filtered broth from between about one and about two moles of bis(2-ethylhexyl) hydrogen phosphate for each mole of streptomycin present, together with an amount of methyl isobutyl ketone between about one-sixth and about one-third of the broth volume, while maintaining the pH substantially between about 5.5 and about 8.0, permitting the two phases thereby formed to separate, washing the solvent layer with water, acidifying to a pH below about 3.0, adjusting the aqueous acid extract thereby obtained to a pH substantially between about 5.0 and about 8.0, filtering the resulting slurry, concentrating the filtrate to an antibiotic potency between about 100,000 and 300,000 u./ml., and recovering the streptomycin sulfate therefrom.

No references cited.